United States Patent [19]

Franke

[11] 3,925,520
[45] Dec. 9, 1975

[54] ALKYLATION OF N-ACYL-O-HYDROCARBYLPHOSPHOROAMIDOTHIOATE SALTS

[75] Inventor: Hans G. Franke, Orinda, Calif.

[73] Assignee: Chevron Research Company, San Francisco, Calif.

[22] Filed: June 17, 1974

[21] Appl. No.: 479,972

Related U.S. Application Data

[63] Continuation-in-part of Ser. No. 317,479, Dec. 21, 1972, Pat. No. 3,832,425.

[52] U.S. Cl. ............... 260/979; 260/978; 260/987
[51] Int. Cl.$^2$ .......................................... C07F 9/24
[58] Field of Search ........................... 260/979, 978

[56] References Cited
UNITED STATES PATENTS

| | | |
|---|---|---|
| 3,662,034 | 5/1972 | Oswald et al. ............... 260/979 X |
| 3,670,057 | 6/1972 | Tsuchiya et al. ............. 260/979 X |
| 3,689,604 | 9/1972 | Schrader et al. ............. 260/979 X |

*Primary Examiner*—Anton H. Sutto
*Attorney, Agent, or Firm*—J. A. Buchanan, Jr.; John Stoner, Jr.; Raymond Owyang

[57] ABSTRACT

S-ammonium (or metal) salts of N-acyl-O-hydrocarbylphosphoroamidothioates horoamidothioates are prepared by reacting an N-acyl-O,O-dihydrocarbylphosphoroamidothioate with an ammonium (or metal) sulfide or polysulfide. The S-ammonium (or metal) salts can be alkylated to produce an O-hydrocarbyl-S-hydrocarbyl-N-acylphosphoroamidothioate.

9 Claims, No Drawings

ALKYLATION OF N-ACYL-O-HYDROCARBYLPHOSPHOROAMIDOTHIOATE SALTS

CROSS-REFERENCE TO RELATED APPLICATION

This application is a continuation-in-part of application Ser. No. 317,479, filed Dec. 21, 1972, now U.S. Pat. No. 3,832,425.

BACKGROUND OF THE INVENTION

U.S. Pat. No. 3,676,555, issued to G. Schrader et al discloses that compounds having the general formula (I)

wherein R is alkyl are excellent insecticides. These compounds are prepared from S-sodium-O-alkylphosphoroamidothioate by reaction with a methylating agent such as methyl iodide. The sodium salt, in turn, is obtained by the reaction of sodium hydroxide with an O,O-dialkylphosphoroamidothioate as illustrated in the following equation (1):

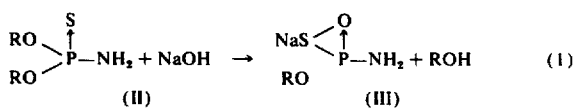

wherein R is alkyl.

Unfortunately, the insecticides of formula (I) have relatively high mammalian toxicity and are therefore of limited use. U.S. application, Ser. No. 13,846, filed Feb. 24, 1970, now U.S. Pat. No. 3,716,600, discloses that N-acylated derivatives, e.g., N-acetyl, of the compounds of formula (I) are of essentially equal insecticidal activity but are significantly less toxic to mammals. However, it has been found by experimentation that preparation of the new and safer insecticides of U.S. Ser. No. 13,846 from the sodium salt of the corresponding N-acylated phosphoroamidothioate was not possible because the sodium salt would not form upon the reaction of an O,O-dialkyl-N-acylphosphoroamidothioate with sodium hydroxide. Under mild conditions only starting material was recovered; and under more forcing conditions, degradation occurred without the formation of the desired sodium salt.

SUMMARY OF THE INVENTION

It has now been found that an S-ammonium (or metal) salt is formed from an O,O-dihydrocarbyl-N-acylphosphoroamidothioate by reaction with an ammonium (or metal) sulfide or polysulfide.

DESCRIPTION OF THE INVENTION

The O,O-Dihydrocarbyl-N-acylphosphoroamidothioate Reactant

The O,O-dihydrocarbyl-N-acylphosphoroamidothioate reactant employed in the process of the invention is represented by the following formula (IV)

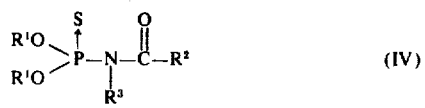

wherein $R^1$ is alkyl, alkenyl or alkynyl of up to six carbon atoms, $R^2$ has up to 18 carbon atoms and is hydrogen, alkyl, alkenyl, phenyl, aralkyl or alkaryl substituted with up to three fluorine, chlorine or bromine atoms or with up to one alkoxy or alkylthio of one to four carbon atoms, and $R^3$ is hydrogen or alkyl of one to six carbon atoms.

Representative alkyl groups which $R^1$ and $R^3$ may represent include methyl, ethyl, propyl, isopropyl, butyl, sec-pentyl and hexyl. Representative $R^1$ alkenyl groups of two to six carbon atoms include vinyl, allyl, 2-butenyl, 3-butenyl, 2-hexenyl, 5-hexenyl, etc. Representative $R^1$ alkynyl groups of three to six carbon atoms include 2-propynyl, 2-butynyl, 3-butynyl, 3-pentynyl, 5-hexynyl, etc. The $R^1$ groups of formula (IV) may be the same or different. The preferred $R^1$ group is alkyl of one to three carbon atoms, especially methyl. The preferred $R^3$ group is hydrogen.

Representative alkyl $R^2$ groups are methyl, ethyl, propyl, isopropyl, sec-butyl, pentyl, hexyl, octyl, decyl, dodecyl, tridecyl, pentadecyl, octadecyl, etc. Representative alkenyl $R^2$ groups are allyl, 2-butenyl, 5-hexenyl, 9-decenyl, 14-pentadecenyl, etc. Representative aralkyl $R^2$ groups are benzyl, 2-phenylethyl, 3-(o-tolyl)propyl, 4-phenylhexyl, 6-(o-tolyl)hexyl, etc. Representative alkaryl $R^2$ groups are o-tolyl, p-tolyl, 2,4-dimethylphenyl, 3,5-diisopropylphenyl, 4-t-butylphenyl, etc.

Representative halo-, alkoxy- and alkylthio-substituted $R^2$ groups include haloalkyl groups such as fluoromethyl, chloromethyl, dichloromethyl, trichloromethyl, tetrachloroethyl, 3-chloropropyl, 4-bromobutyl, 10-chlorodecyl, 14-bromotetradecyl, etc; haloalkenyl such as trichlorovinyl, 2,2-difluorovinyl, 2-bromo-9-decenyl, etc; haloaryl groups such as 4-chlorophenyl, 2,4-difluorophenyl, 3,5-dibromophenyl, 4-chlorobenzyl, 2-chloro-4-methylphenyl, etc.; alkoxyalkyl groups such as methoxymethyl, ethoxymethyl, 2-ethoxyethyl, 4-butoxybutyl, etc.; alkoxyalkenyl such as 4-methoxy-2-butenyl, 5-ethoxy-3-pentenyl, etc.; alkoxyaryl such as 4-methoxyphenyl, 2-methoxy-4-methylphenyl, 3-propoxyphenyl, 2-(2-methoxyphenyl)ethyl, etc.; alkylthioalkyl such as methylthiomethyl, ethylthiomethyl, 2-ethylthioethyl, 5-pentylthiopentyl, etc.; alkylthioalkenyl such as 4-methylthio-2-butenyl, 4-ethylthio-3-hexenyl, etc.; alkylthioaryl such as 4-methylthiophenyl, 2-ethylthiobenzyl, 3-methyl-4-methylthiophenyl, 4-(2-methylthiophenyl)butyl, etc. The most preferred $R^2$ groups are alkyl of one to six carbon atoms, especially methyl.

Preferred $R^2$ groups have up to 12 carbon atoms. Most preferred $R^2$ groups are alkyl of one to 12 carbon atoms and alkoxyalkyl of two to 12 carbon atoms.

The compounds of formula (I) may be prepared by acylating an O,O-dihydrocarbylphosphoroamidothioate with an appropriate acylating agent, e.g., an acid halide (VI) or acid anhydride (VII), as depicted in the following equation (2)

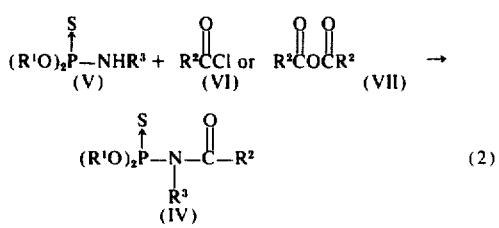

wherein $R^1$, $R^2$ and $R^3$ have the same significance as previously defined.

The acylation reaction (2) is usually carried out at about 0-60°C in the presence of solvent such as methylene dichloride, chloroform, tetrahydrofuran and benzene. Pressure is not critical in this reaction. For convenience, atmospheric or autogenous pressure may be used. Under normal conditions, stoichiometric proportions or a slight excess of the acylating agent (VI or VII) will be used. The acylation reaction will usually take 2 to 24 hours to reach completion. The product (IV) may be purified by conventional techniques such as extraction, crystallization, chromatography, etc.

The O,O-dihydrocarbylphosphoroamidothioate compounds (V) used to prepare the N-acylphosphoroamidothioate compound (IV) may be prepared by the following reactions:

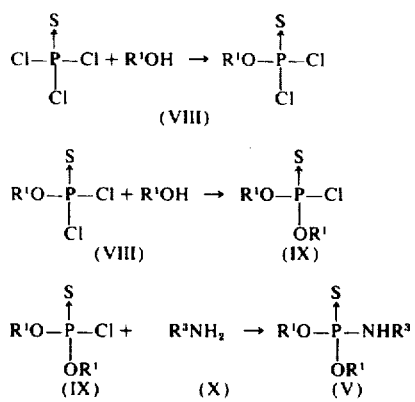

wherein $R^1$ and $R^3$ have the same significance as previously defined.

The first two reactions (equations 3-4) of the synthesis involve the addition of 2 mols of the alcohol (VIII) to 1 mol of phosphorous thiochloride ($PSCl_3$) (if both $R^1$ are the same, a single reaction can be carried out). These reactions are preferably carried out in the presence of a weak base, such as the organic amines, for example pyridine, dimethylaniline, triethylamine, etc. The base is preferably present in an amount at least equal to the mols of alcohol. An inert organic solvent, such as diethyl ether, tetrahydrofuran, dioxane, dichloromethane, etc. may be present. The reaction temperatures are generally in the range of 0° to 15°C., preferably 0° to 5°C. The reaction time necessary to complete the addition of the alcohol (VIII) to the phosphorous thiochloride will range from about 1 to 10 hours. The O,O-dihydrocarbylphosphorochloridothioate product (IX) can be purified by distillation, is desired.

The third reaction (equation 5) of the synthesis is carried out by reacting excess (e.g. 2 molar equivalents) of gaseous ammonia or the amine (X) with the O,O-dihydrocarbylphosphorochloridothioate (IX). The reaction is generally carried out in an inert organic solvent, such as benzene, toluene, xylene and the like, at temperatures in the range of 10°-75°C. Completion of the reaction is indicated by cessation of ammonium chloride or amine hydrochloride precipitation. Following the reaction, the product (V) can be isolated by conventional methods such as filtration, extraction, distillation, chromatography, etc.

The Sulfide and Polysulfide Reactant

Ammonium sulfide and polysulfide, e.g. $(NH_4)_2S_x$, wherein $x$ is 1 to 5, of reasonable purity are suitably employed in the process of the invention. Commercially available aqueous solutions of ammonium sulfide or polysulfide are particularly suitable for use in the process.

Metal sulfides are polysulfides suitably employed in the process of the invention include alkali metal, e.g., lithium, sodium, or potassium and alkaline earth metal, e.g. calcium or barium, sulfides.

Ammonium sulfide and polysulfide are preferred over metal sulfides in the process of the invention.

The Reaction Conditions

The process of the invention is suitably conducted in the liquid phase in the presence or absence of an inert solvent which is liquid at reaction temperature and pressure. Suitable organic solvents include oxygenated hydrocarbons such as alkanols of one to six carbon atoms, e.g., methanol, ethanol, isopropanol, butanol, hexanol, etc.; dialkyl ketones of up to 8 carbon atoms, e.g., acetone, methyl ethyl ketone, etc.; acyclic alkyl ethers, e.g., dimethyl ether, dibutyl ether, dimethoxyethane, diethylene glycol dimethyl ether, etc.; and cycloalkyl ethers, e.g., dioxane, tetrahydrofuran and tetrahydropyran. Other suitable organic solvents include nitriles such as acetonitrile and propionitrile; and dialkylamides such as dimethylformamide; dialkylsulfoxides such as dimethylsulfoxide. Still other suitable solvents comprise water or water containing a portion of a polar organic co-solvent. Suitable mixtures of water and a polar organic co-solvent vary by volume, from about 20% co-solvent to 80% co-solvent and from about 20% water to 80% water. Solvents are used in quantities sufficient to form a slurry of the reactants or a substantially liquid phase solution. Generally, up to 100 mols of solvent per mol of the N-acylphosphoroamidothioate is employed. The process is preferably conducted in the presence of a solvent, and the preferred solvent is water or a mixture of water and a polar organic solvent.

The temperature of the reaction may vary from about 10° to 100°C, preferably from 25° to 75°C. Pressure is not critical, so long as the reaction mixture is maintained substantially in a non-gaseous phase. Typical pressures vary from 1 to 10 atmospheres. The time of reaction varies with the temperature. In general, the reaction is complete within 10 hours, more usually within 5 hours or less.

The molar ratio of ammonium (or metal) sulfide or polysulfide to N-acylphosphoroamidothioate varies from about 1:2 to 10:1, preferably from about 1:2 to 2:1.

The process of the invention produces as by-products hydrocarbyl mercaptans, dihydrocarbyl sulfides and/or dihydrocarbyl polysulfides, e.g., $R^1SH$, $R^1SR^1$ or $R^1SSR^1$ wherein $R^1$ has the same significance as previously defined. It has been found that the additional presence of sulfur and/or ammonia as reaction components results in the formation of principally dihydrocarbyl disulfide by-products. When sulfur or ammonia is employed, the molar ratio of sulfur (or ammonia) to ammonium (or metal) sulfide or polysulfide varies from about 5:1 to 1:5, preferably from about 2:1 to 1:2.

The precise method of contacting the reactants employed in the process of the invention is not critical. In the preferred modification, the sulfide or polysulfide, the N-acylphosphoroamidothioate and solvent (and sulfur or ammonia, if any) are maintained with agitation at reaction temperature and pressure for the desired reaction period. The S-salt of the N-acylphosphoroamidothioate is sometimes soluble in the reaction medium and may be used for further reactions without separation. However, the product usually precipitates upon standing as a solid crystalline material which may be collected by filtration, centrifugation or decantation. The solid product can be purified by washing with a liquid or by crystallization from an appropriate solvent such as acetone, ethanol, etc.

The Metal and Ammonium Phosphoroamidothioate Salts

The S-metal and S-ammonium salts produced by the process of the invention are represented by the formula (XII)

wherein $R^1$, $R^2$ and $R^3$ have the same significance as previously defined and M is ammonium or a metal cation, e.g., an alkali or alkaline earth metal cation.

Illustrative S-metal and S-ammonium salts of formula (XII) are S-ammonium-N-acetyl-O-methylphosphoroamidothioate, S-ammonium-N-crotonoyl-O-ethylphosphoroamidothioate, S-ammonium-N-trichloroacetyl-N-methyl-O-propylphosphoroamidothioate, S-lithium-N-methoxyacetyl-O-methylphosphoroamidothioate, S-lithium-N-4-chlorocrotonyl-O-butylphosphoroamidothioate, S-lithium-N-4-alkoxybenzoyl-O-methylphosphoroamidothioate, S-lithium-N-3-phenylpropionyl-O-methylphosphoroamidothioate, S-sodium-N-hexanoyl-O-methylphosphoroamidothioate (m.p. 105°–108°C), S-sodium-N-isovaleryl-O-methylphosphoroamidothioate (m.p. 115°–118°C), S-sodium-N-acetyl-N-isopropyl-O-methylphosphoroamidothioate, S-sodium-N-methoxyacetyl-O-methylphosphoroamidothioate, S-sodium-N-propionyl-O-methylphosphoroamidothioate, S-sodium-N-methylthioacetyl-O-methylphosphoroamidothioate, S-sodium-N-butyryl-O-methylphosphoroamidothioate, S-sodium-N-octanoyl-O-methylphosphoroamidothioate, S-sodium-N-decanoyl-O-methylphosphoroamidothioate, S-sodium-N-dichloroacetyl-O-methylphosphoroamidothioate, S-potassium-N-acetyl-O-ethylphosphoroamidothioate, S-sodium-N-ethoxyacetyl-O-ethylphosphoroamidothioate, S-potassium-N-fluoroacetyl-N-isopropyl-O-hexylphosphoroamidothioate, S-potassium-N-ethylthioacetyl-O-methylphosphoroamidothioate, S-potassium-N-propionyl-O-methylphosphoroamidothioate, S-potassium-N-4-methylbenzoyl-O-methylphosphoroamidothioate, S-calcium-N-acetyl-O-methylphosphoroamidothioate, S-calcium-N-methoxyacetyl-O-methylphosphoroamidothioate, S-barium-N-acetyl-O-methylphosphoroamidothioate, S-barium-N-4-methoxybutyryl-O-methylphosphoroamidothioate, etc.

The preferred salts of formula (VI) are those wherein M is sodium, potassium or ammonium and $R^2$ is alkyl or alkoxyalkyl. The most preferred salts are N-alkanoylphosphoroamidothioates wherein M is ammonium, $R^2$ is alkyl of one to 11 carbon atoms, and both $R^1$ are the same. The ammonium salts are preferred in part because they are substantially less hygroscopic than the corresponding metal salts.

The metal and ammonium salts prepared by the process of this invention are useful intermediates for the preparation of O-hydrocarbyl-S-alkyl- or alkenyl-N-acylphosphoroamidothioates. They are especially useful in the preparation of compounds having different groups attached to the sulfur and oxygen atoms. These derivatives are prepared by reacting the salt with an alkylating agent. Suitable alkylating agents include the alkyl and alkenyl halides of up to 10 carbon atoms, as methyl iodide, ethyl bromide, allyl chloride, hexyl bromide, crotyl chloride, benzyl chloride, propargyl bromide, isopropyl iodide, etc.; the dialkyl and dialkenyl sulfates of up to 10 carbon atoms, such as dimethyl sulfate, diethyl sulfate, diallylsulfate, etc.; and the alkyl and alkenyl aryl- or alkenesulfonates, such as methyl p-toluene sulfonate, ethyl 2,4-xylenesulfonate, allyl p-toluenesulfonate, methyl methanesulfonate, allyl methanesulfonate, etc. The preferred alkylating agents are the dialkyl sulfates especially the dimethyl sulfate.

Alkylation is effected by mixing the S-salts of the N-acylated phosphoroamidothioates and the alkylating agent in an inert solvent or in excess of liquid alkylating agent at temperatures in the range of 0°–80°C, preferably 25°–60°C. Suitable solvents are the halogenated hydrocarbons such as dichloromethane, chloroform, tetrachloroethane, or acetonitrile, acetone, methanol, etc. The preferred solvent is water.

EXAMPLES

The following examples illustrate the variations in the process of making S-salts of N-acylphosphoroamidothioates.

EXAMPLE 1

Preparation of S-ammonium-O-methyl-N-acetylphosphoroamidothioate

S-ammonium-O-methyl-N-acetylphosphoroamidothioate was prepared in a series of experiments by reacting O,O-dimethyl-N-acetylphosphoroamidothioate with ammonium sulfide in aqueous reaction medium under a variety of reaction conditions, including the presence of sulfur and/or ammonia as additional reactants. Each experiment was conducted by contacting the reactants in aqueous reaction medium for the indicated reaction time at the indicated temperature. The reaction mixture was then evaporated at low temperature under reduced pressure to give the ammonium salt product. The ammonium salt is then purified by washing with an inert solvent such as acetonitrile and dried.

The ammonium salt is characterized by a melting point of greater than 220°C and a nuclear magnetic resonance spectrum having a doublet at 3.55 δ, J = 13 cps, (3H) and a doublet at 2.06 δ, J = 1 cps, (3H).

The reactants employed, the reaction conditions and the yield of S-ammonium salt are tabulated in Table 1.

TABLE I

| Run | Mol P Compd.* | Mol (NH₄)₂S | Mol Sulfur | Mol NH₃ | Mol Water | Temp. °C | Time Hr. | % Yield NH₄ Salt |
|---|---|---|---|---|---|---|---|---|
| 1  | 0.046 | 0.05  | 0    | 0    | 0.7     | 55 | 3   | 97   |
| 2  | 0.1   | 0.1   | 0    | 0    | 1.4     | 45 | 2   | 97.5 |
| 3  | 0.046 | 0.05  | 0    | 0    | 0.7     | 55 | 1.5 | 99   |
| 4  | 0.1   | 0.075 | 0    | 0    | 1.1     | 55 | 2   | 75   |
| 5  | 0.046 | 0.025 | 0    | 0    | 0.35    | 55 | 3   | 64   |
| 6  | 0.2   | 0.2   | 0.15 | 0    | 1.8–2.2 | 50 | 2   | 100  |
| 7  | 0.2   | 0.18  | 0.15 | 0    | 1.8–2.2 | 50 | 2   | 98.3 |
| 8  | 0.2   | 0.16  | 0.15 | 0    | 1.8–2.2 | 50 | 2   | 99   |
| 9  | 0.2   | 0.14  | 0.15 | 0    | 1.8–2.2 | 50 | 2   | 100  |
| 10 | 0.2   | 0.12  | 0.15 | 0    | 1.8–2.2 | 50 | 2   | 98.4 |
| 11 | 0.2   | 0.12  | 0.15 | 0    | 1.8–2.2 | 50 | 2   | 99.5 |
| 12 | 0.2   | 0.10  | 0.15 | 0    | 1.8–2.2 | 50 | 2   | 87.3 |
| 13 | 0.2   | 0.10  | 0.15 | 0    | 1.8–2.2 | 50 | 2   | 84.4 |
| 14 | 0.2   | 0.10  | 0.15 | 0    | 1.8–2.2 | 30 | 2   | 87.1 |
| 15 | 0.2   | 0.10  | 0.15 | 0    | 2       | 40 | 2   | 91.3 |
| 16 | 0.12  | 0.06  | 0.15 | 0    | 2       | 40 | 2   | 100  |
| 17 | 0.2   | 0.1   | 0.15 | 0.04 | 2       | 40 | 2   | 95.6 |
| 18 | 0.2   | 0.1   | 0.15 | 0.2  | 2       | 40 | 2   | 94.6 |

*O,O-dimethyl-N-acetylphosphoroamidothioate

EXAMPLE 2

Preparation of S-methyl-O-methyl-N-acetyl phosphoroamidothioate

S-ammonium-O-methyl-N-acetylphosphoroamidothioate was prepared by a procedure similar to that of Run 1, Example 1, except that the ammonium salt was not isolated. Instead the ammonium salt-containing reaction mixture was acidified with sulfuric acid to pH 5.4 and then reacted with 0.26 mol of dimethyl sulfate for 3 hours at 15°–30°C. The resulting reaction mixture was neutralized (pH 7) with ammonium hydroxide and then was continuously extracted with methylene dichloride. Evaporation of the methylene dichloride extracts gave a 93.6% yield of S-methyl-O-methyl-N-acetylphosphoroamidothioate, m.p. 82°–85°C (a commercial insecticide marketed under the trade name ORTHENE Insecticide).

EXAMPLE 3

Preparation of S-ammonium-O-methyl-N-acetyl phosphoroamidothioate

S-ammonium-O-methyl-N-acetylphosphoroamidothioate was prepared in a series of experiments by reacting O,O-dimethyl-N-acetylphosphoroamidothioate with polysulfide [52% (NH₄)₂S$_x$ where $x$ is 1 to 5] in aqueous reaction medium. Each experiment was conducted by a procedure similar to that of Example 1. The reaction conditions and results are tabulated in Table II.

TABLE II

| Run | Mol P Compd. | Mol (NH₄)₂S$_x$ | Mol H₂O | Temp. °C | Time Hr. | % Yield NH₄ Salt |
|---|---|---|---|---|---|---|
| 1 | 0.744 | 0.744 | 11.3 | 60    | 2   | 100  |
| 2 | 0.269 | 0.269 | 4.1  | 55    | 2   | 98.5 |
| 3 | 0.231 | 0.231 | 3.5  | 55    | 2   | 100  |
| 4 | 0.25  | 0.25  | 4.2  | 75    | 0.5 | 91.4 |
| 5 | 0.20  | 0.20  | 0.69 | 15–23 | 72  | 100  |
| 6 | 0.20  | 0.26  | 0.91 | 15–23 | 18  | 98   |
| 7 | 1.25  | 1.25  | 4.4  | 15–23 | 18  | 99.5 |
| 8 | 1.00  | 1.00  | 15.1 | 55    | 2   | 100  |

EXAMPLE 4

Preparation of Metal Salts of O-methyl-N-acetylphosphoroamidothioate

Alkali and alkaline earth metal salts of O-methyl-N-acetylphosphoroamidothioate were prepared in a series of experiments by reacting O,O-dimethyl-N-acetylphosphoroamidothioate with alkali and alkaline earth metal sulfides. Each experiment was conducted by contacting the reactants for the indicated reaction time at the indicated temperature. The reaction mixture was then evaporated at low temperature under reduced pressure to give metal salt product. The metal salt is then purified by washing with acetonitrile and dried. The reactants employed, the reaction conditions and the results are tabulated in Table III.

TABLE III

| Run | Mol P Compound | Sulfide (mol) | Solvent (mol) | Temp. °C | Time Hrs. | % Yield S-Salt |
|---|---|---|---|---|---|---|
| 1 | 0.2  | Na₂S* (0.1)  | C₂H₅OH (2)   | 60  | 3   | 57  |
| 2 | 0.1  | Na₂S (0.1)   | C₂H₅OH (2)   | 60  | 3   | 60  |
| 3 | 0.1  | Na₂S (0.5)   | H₂O (2.8)    | 55  | 2   | 31  |
| 4 | 0.1  | Na₂S (0.1)   | H₂O (4.7)    | 55  | 2   | 44  |
| 5 | 0.05 | K₂S (0.05)   | neat         | 55  | 3   | 0   |
| 6 | 0.1  | K₂S (0.05)   | H₂O (2.8)    | 55  | 2   | 51  |
| 7 | 0.1  | K₂S (0.1)    | H₂O (2.8)    | 55  | 2   | 100 |
| 8 | 0.1  | K₂S (0.1)    | H₂O (6.7)    | 100 | 2   | 100 |
| 9 | 0.1  | BaS (0.1)    | H₂O (2.8)    | 50  | 2.5 | —   |

*0.2 mol NH₄Cl used as additional reactant

EXAMPLE 5

Preparation of S-ammonium-O-methyl-N-acetylphosphoroamidothioate

S-ammonium-O-methyl-N-acetylphosphoroamidothioate was prepared in a series of experiments by reacting O,O-dimethyl-N-acetylphosphoroamidothioate with ammonia (or ammonium hydroxide or acetate) under a variety of reaction conditions. In runs 9, 10 and 14 hydrogen sulfide (0.15–0.16 mol) was added as an additional reactant. Each experiment was conducted by contacting the reactants at the indicated temperature for the indicated reaction period. The reaction mixture was then evaporated at low temperature under reduced pressure to give the ammonium salt product. The ammonium salt is then purified by washing with an inert solvent such as acetonitrile and dried. The reactants employed, the reaction conditions and the results are tabulated in Table IV.

TABLE IV

| Run | Mol P Compd.* | Mol $NH_3$ | Solvent (Mol) | Temp. °C | Time Hr. | % Yield $NH_4$ Salt |
|---|---|---|---|---|---|---|
| 1 | 2.54 | 3 | neat | 40–50 | 3 | 30 |
| 2 | 0.25 | 3 | $CH_2Cl_2$ (0.78) | reflux | 5 | 0 |
| 3 | 0.36 | 0.88 | $CH_3OH$ (1.25) | 45–48 | 1.3 | 3 |
| 4 | 0.147 | 0.70 | DME$^a$ (0.2) | 75 | 3.5 | 57 |
| 5 | 0.55 | 3.5 | DME (0.28) | 65 | 4.5 | 72 |
| 6 | 0.041 | 0.05 | DME (0.028) | 55 | 3 | 45 |
| 7 | 0.041 | 0.05 | DME (0.028) | 40–45 | 40 | 33 |
| 8 | 0.13 | 1.2 | Dioxane (0.18) | 65 | 3 | 51 |
| 9 | 0.1$^b$ | 0.3 | DME (0.47) | 55 | 1 | 5 |
| 10 | 0.1$^b$ | 0.3 | $C_2H_5OH$ (0.87) | 55 | 1.5 | 58 |
| 11 | 0.038 | 0.82$^c$ | $H_2O^c$ | 55 | 2.5 | 38 |
| 12 | 0.11 | 0.8$^c$ | $CH_3OH$ (0.62) | 23 | 48 | 23 |
| 13 | 0.11 | 0.45$^c$ | DME (0.28) | 25 | 2 weeks | 0 |
| 14 | 0.1$^b$ | 0.2$^c$ | $H_2O$ (0.49) | 55 | 2 | 61 |
| 15 | 0.114 | 0.114$^d$ | neat | 60 | 3 | 0 |

*O,O-dimethyl-N-acetylphosphoroamidothioate
$^a$Dimethoxyethane
$^b$0.15–0.16 mol $H_2S$ used as additional reactant
$^c$Concentrated aqueous $NH_4OH$
$^d$Ammonium acetate

EXAMPLE 6

A mixture of 12.3 g (0.05 mol) O,O,-dimethyl-N-methoxyacetylphosphoroamidothioate, 6.5 g. of 52% wt. aqueous ammonium sulfide solution (0.05 mol ammonium sulfide), and 5 ml. water was stirred for 3 hours at about 25°C. The reaction mixture was evaporated under reduced pressure to give a brown oil. The oil was diluted with acetonitrile. After standing several days, a brown solid crystallized. The solid was recovered by filtration, washed with acetonitrile and dried. Nuclear magnetic resonance analysis of the product (5 g.) indicated that it was a 50:50 mixture of S-ammonium-O-methyl-N-methoxyacetylphosphoroamidothioate and O-ammonium-S-methyl-N-methoxyacetylphosphoroamidothioate.

EXAMPLE 7

Hygroscopicity of S-ammonium-O-methyl-N-acetylphosphoroamidothioate

A 3.195 g. sample of S-ammonium-O-methyl-N-acetylphosphoroamidothioate was stored in a desiccator containing a reservoir of water at 25°C. After 24 hours, the weight of the sample increased by 1.2%. In a similar experiment with S-sodium-O-methyl-N-acetylphosphoroamidothioate, the weight of the sample increased by 11.1%.

EXAMPLE 8

A solution of 5.5 g (0.03 mol) O,O-dimethyl-N-acetylphosphoroamidothioate, 2.4 g. (0.03 mol) of 50% aqueous sodium hydroxide solution and 15 ml. of methanol was allowed to stand at about 25°C for 26 hours. The solution was evaporated under reduced pressure to give a viscous oil. When the oil was diluted with acetone, no sodium salt precipitate was obtained. The acetone was removed by evaporation under reduced pressure and the resulting oil was diluted with water and acidified with hydrochloric acid. The aqueous mixture was extracted with methylene dichloride. The methylene dichloride extracts were washed with water, dried over magnesium sulfate and evaporated under reduced pressure to give a yellow oil. Infrared and nuclear magnetic resonance spectroscopic analysis showed the oil to be O,O-dimethyl-N-acetylphosphoroamidothioate recovered without change.

The procedure employed above is essentially identical to that disclosed in German application No. F 43,328 (priority application for U.S. Pat. No. 3,676,555) for the preparation of S-sodium-O-ethyl-phosphoroamidothioate.

EXAMPLE 9

A solution of 11 g. (0.06 mol) O,O-dimethyl-N-acetylphosphoroamidothioate, 4.8 g. (0.06 mol) of 50% aqueous sodium hydroxide solution and 30 ml. methanol was refluxed for 2 hours. The solution was evaporated under reduced pressure to give a semisolid residue. The residue was diluted with acetone and filtered to give 1.6 g. of a solid. Analysis of the solid for S-sodium-O-methyl-N-acetylphosphoroamidothioate ($C_3H_7NO_3PSNa$) showed:

|  | Calc. | Found |
|---|---|---|
| % N | 7.33 | trace |
| % P | 16.20 | trace |
| % S | 16.78 | 5.39 |

The filtrate was evaporated under reduced pressure to give a yellow oil. The oil was diluted with water and acidified with hydrochloric acid. The aqueous mixture was extracted with methylene dichloride. The methylene dichloride extracts were washed with water, dried over magnesium sulfate and evaporated under reduced pressure to give a yellow oil. The infrared spectrum of the oil was nearly identical to the infrared spectrum of the O,O-dimethyl-N-acetylphosphoroamidothioate starting material.

EXAMPLE 10

Preparation of S-methyl-O-methyl-N-acetylphosphoroamidothioate

A 6.6-g (0.052 mol) sample of dimethyl sulfate was added to a solution of 5.0 g (0.026 mol) S-sodium-O-methyl-N-acetylphosphoroamidothioate in 15 ml of water. The reaction mixture (mild exotherm) was stirred at ambient temperature (25°–35°C.) for 3 hours. The reaction mixture was evaporated, diluted with methylene chloride and filtered to give 4.8 g (90%) of S-methyl-O-methyl-N-acetylphosphoroamidothioate.

What is claimed is:

1. A process for producing an O-hydrocarbyl-S-hydrocarbyl-N-acylphosphoroamidothioate which comprises:

1. reacting an N-acylphosphoroamidothioate of the formula

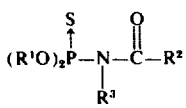

wherein $R^1$ individually is alkyl, alkenyl, or alkynyl of up to six carbon atoms, $R^2$ has up to 18 carbon atoms and is hydrogen, alkyl, alkenyl, phenyl, aralkyl or alkaryl substituted with up to three fluorine, chlorine or bromine atoms or with up to one alkoxy or alkylthio of up to four atoms, and $R^3$ is hydrogen or alkyl of one to six carbon atoms, with an ammonium, sulfide or polysulfide in aqueous phase at a temperature of about 10°C to 125°C to produce an S-ammonium salt of the N-acylphosphoroamidothioate, and 2. reacting the resulting S-ammonium salt with an alkylating agent in an inert solvent at a temperature of 0° to 80°C. to produce the O-hydrocarbyl-S-hydrocarbyl-N-acylphosphoroamidothioate.

2. The process of claim 1 wherein $R^1$ is alkyl, $R^2$ is alkyl and $R^3$ is hydrogen.

3. The process of claim 2 wherein the sulfide or polysulfide is an ammonium sulfide or polysulfide.

4. The process of claim 2 wherein the sulfide or polysulfide is ammonium sulfide.

5. The process of claim 2 wherein $R^2$ is alkyl of one to six carbon atoms.

6. The process of claim 5 wherein $R^1$ and $R^2$ are methyl.

7. The process of claim 6 wherein the alkylating agent is dimethyl sulfate.

8. The process of claim 5 wherein the alkylating agent is a dialkyl sulfate, alkyl sulfonate or alkyl halide.

9. The process of claim 8 wherein the alkylating agent is a dialkyl sulfate.

* * * * *